United States Patent
Sathe

(10) Patent No.: US 9,626,795 B2
(45) Date of Patent: Apr. 18, 2017

(54) REDUCING SHADING BY MERGING FRAGMENTS FROM THE ADJACENT PRIMITIVES

(71) Applicant: Intel Corporation, Santa Clara, CA (US)

(72) Inventor: Rahul P. Sathe, Emeryville, CA (US)

(73) Assignee: Intel Corporation, Santa Clara, CA (US)

( * ) Notice: Subject to any disclaimer, the term of this patent is extended or adjusted under 35 U.S.C. 154(b) by 234 days.

(21) Appl. No.: 14/108,419

(22) Filed: Dec. 17, 2013

(65) Prior Publication Data

US 2015/0170410 A1 Jun. 18, 2015

(51) Int. Cl.
*G06T 15/50* (2011.01)
*G06T 15/80* (2011.01)
*G06T 17/20* (2006.01)

(52) U.S. Cl.
CPC .............. *G06T 15/80* (2013.01); *G06T 17/20* (2013.01)

(58) Field of Classification Search
None
See application file for complete search history.

(56) References Cited

U.S. PATENT DOCUMENTS

| | | | | |
|---|---|---|---|---|
| 2007/0077964 A1* | 4/2007 | Llanos | ................. | H04W 88/06 455/557 |
| 2013/0158838 A1* | 6/2013 | Yorke | ................. | B60W 10/06 701/103 |
| 2013/0257891 A1 | 10/2013 | Sathe et al. | | |
| 2014/0022273 A1* | 1/2014 | Vidimce | ................. | G06T 5/00 345/589 |
| 2014/0071150 A1* | 3/2014 | Fishwick | ................. | G06T 1/00 345/589 |
| 2014/0327696 A1* | 11/2014 | Pomianowski | ......... | G06T 11/40 345/611 |

OTHER PUBLICATIONS

Kayvon Fatahalian et al., "Reducing shading on GPUs using quad-fragment merging", 2010, SIGGRAPH '10 ACM Article No. 67.*
U.S. Appl. No. 14/133,757, filed Dec. 19, 2013 entitled "Variable Shading."
U.S. Appl. No. 14/103,951, filed Dec. 12, 2013 entitled "Decoupled Shading Pipeline."

* cited by examiner

*Primary Examiner* — Frank Chen
(74) *Attorney, Agent, or Firm* — Trop Pruner & Hu, P.C.

(57) ABSTRACT

Instead of shading a triangle from the rasterizer as soon as it is known that there is a sample inside the triangle, in accordance with one embodiment, shading is delayed until the triangle beside it, called the neighboring triangle, is received. If there is a neighboring triangle facing the same way, with non-mutually exclusive coverage, meaning that it is not overlapping the same region, then the shader shades only once for the pair of triangles. That is, two separate fragments are merged and treated as one fragment. Specifically, the fragment that is over the pixel center is the one that is used and the other fragment is replaced by merging. The merger happens only over the extent of a pixel and more than one primitive is not shaded at a time. However, multiple merges within a 2×2 block of pixels are possible.

30 Claims, 5 Drawing Sheets

REDUCING SHADING BY MERGING FRAGMENTS FROM THE ADJACENT PRIMITIVES

BACKGROUND

This relates generally to graphics processing.

Conventionally, tessellated or non-tessellated triangles from the rasterizer are sent to a pixel shader for shading. Whenever possible, a depth-stencil test may be performed before shading to avoid unnecessary shading. In the pixel shader, color and texture may be applied to those triangles.

Generally the triangles are sent for shading in blocks of 2×2 pixels called a shading quad. The reason for this is that there are derivatives that must be determined for mip map calculations that involve calculating finite differences in x and y directions. Information from a group of pixels is used to calculate the derivatives.

Even if a triangle touches just one pixel, the shader still ends up using at least two other pixels so that the derivatives can be determined. The shading quad is static; it always is in the same screen position regardless of how triangles land on the screen.

In multi-sampled anti-aliasing (MSAA), the rasterizer typically tests at every sample location, whether the sample location is inside the triangle being rasterized or not. If the sample is inside the triangle, then the entire 2×2 quad is shaded.

For example 8× multi-sampled anti-aliasing shades eight samples the same way. If all eight samples are covered by the triangle, only the pixel center is shaded and all eight samples get that color. This is true even if the triangle only hits one of the samples. Four pixels are still shaded, using that color for only the one sample covered by the triangle. Sometimes it is possible to shade at locations other than pixel centers, e.g. centroid sampling.

BRIEF DESCRIPTION OF THE DRAWINGS

Some embodiments are described with respect to the following figures.

DETAILED DESCRIPTION

Instead of shading a triangle from the rasterizer as soon as it is known that there is a sample inside the triangle, in accordance with one embodiment, shading is delayed until the triangle beside it, called the neighboring triangle, is received. If there is a neighboring triangle facing the same way, with mutually exclusive coverage, meaning that it is not overlapping the same region, then the shader shades only once for the pair of triangles. That is, two separate fragments are merged and treated as one fragment. Specifically, the fragment that is over the pixel center is the one that is used and the other fragment is replaced by merging. The merger only happens for one pixel.

As used herein, a triangle is a typical example of a primitive, but the concepts described herein apply to any polygon.

One benefit of merging per pixel or only having one triangle being fired to the shader at a time, is that the calculation of the derivatives is much more accurate compared to merging so that more than one triangle is shaded at a time.

When more than one triangle is shaded at the same time, less accuracy may result because the derivatives must be changed for all the contributing triangles. Moreover, the shading system must interpolate using multiple triangles' edge equations.

In accordance with one embodiment, the primitive that does not cover the pixel center is not shaded and instead the samples receive the color of the neighboring fragment that does cover the pixel center. As a result, no derivatives are changed for the fragment covering pixel center.

In some embodiments, coarse pixel shading (also called decoupled pixel shading) may be advantageous. In coarse pixel shading, the shading rate may change across the picture or frame. For example the shading rate may be lower around the periphery of the frame and higher in the center, as one example.

Figure 7:
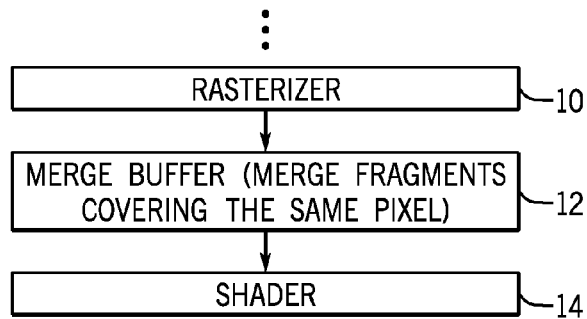
FIG. 7 is a schematic depiction for one embodiment.

In accordance with some embodiments, a merge buffer 12 is positioned between the rasterizer 10 and the pixel shader 14, as shown in FIG. 7, in a graphics pipeline. The merge buffer merges fragments from neighboring connected primitives covering the same pixel and dispatches the shading for the 2×2 block corresponding to the fragment covering the pixel center. It then uses the shading results of that fragment for the fragment that did not cover the pixel center but came from the adjacent primitive. In effect, this saves the shading of internal or non-silhouette fragments that do not cover the pixel centers. Whenever possible, depth/stencil checks are done before shading and before merge buffer 12, for "Early Depth/Stencil Test."

Thus, some embodiments save shading only along the internal (non-silhouette) edges. As the triangle size gets smaller, the relative shading along the internal edges forms a bigger percentage of the total shading and the total bandwidth used. Thus the workload with smaller triangles may benefit more in some embodiments. The portion of the triangle that covers at least one sample in a 2×2 region along with the shading inputs at the pixels' centers for those 2×2 pixels is called a quad fragment.

The merge buffer merges the fragments within a single pixel rather than a 2×2 pixel region. Thus the merge granularity is one pixel and is decoupled from the shade granularity which is 2×2 pixels corresponding to a quad fragment.

Adjacency between two triangles may be tracked using an edge identifier in one embodiment. An edge identifier is generated using vertex identifiers so the vertices form the edge. The identifier may be made generic by keeping the smaller identifier first and then the larger identifier and a bit that is set if the edge orientation is in an opposite direction. The edge identifiers for the shared edge have different orientation bits. Thus a pseudo code for the edge identifiers is as follows:

```
struct Edge {
    uint smallerVertexID, largerVertexID;
    bool orientation;
}
```

A fragment is a portion of a primitive covering at least one sample within a pixel. The fragment keeps track of the coverage within the pixel, the orientation of the primitive (whether it is back facing or front facing) and a pointer to the corresponding shading quad structure. The corresponding pseudo code for a fragment is as follows:

```
struct Fragment {
    int x,y;
    bool facing;
    BITMASK coverage; // MULTISAMPLES number of bits
    float z[MULTISAMPLES]
    ShadingQuad *pQuad;
}
```

A shading quad is a 2×2 blocks of pixels and the corresponding shading inputs. The pseudo code for the shading quad is as follows:

```
struct ShadingQuad {
    BITMASK shade_coverage; // 4 bits.
    SHADER_INPUT shadeInputData[4];
}
```

A merge buffer stores fragments coming from partially covered quad fragments along with the outer edges of the contiguous primitives contributing to the fragment either before or after the merge. When n contiguous triangles are merged, one can have at most (n+2) outer edges, because each merge removes at least one shared edge and adds at the most two more outer edges. Thus the buffer entry is as follows:

```
struct BufferEntry {
    Fragment frag;
    Edge outerEdges[N+2]; // N is configurable
};
```

The criteria for merger is whether two primitives share a common edge, face the same way, have mutually exclusive pixel coverage and involve one and only one pixel. In the following pseudo code, the function IsAdjacent( ) checks to see if an incoming fragment shares an edge with an existing fragment:

```
bool can_merge (e1, e2) {
    return    e1.frag.x == e2.frag.x &&
              e1.frag.y == e2.frag.y &&
              e1.frag.facing == e2.frag.facing &&
              (e1.frag.coverage & e2.frag.coverage) == 0 &&
              IsAdjacent (e1, e1);
}
// e1 is existing fragment and e2 is incoming fragment.
bool IsAdjacent (Fragment e1, Fragment e2) {
    foreach edge (e1.outerEdges[ ]) {
        for each triEdge (e2.outerEdges [ ]) {
            if (IsShared (edge, triEdge))
                return true;
        }
    }
    return false;
}
```

If the fragments can be merged, the two fragments are merged according to the following pseudo code:

```
// merge quad-fragment in entry e2 into e1
void merge (e1, e2) {
    select_shading_inputs (e1.frag, e2.frag);
    copy_z (e1.frag, e2.frag);
    e1.frag.coverage | = e2.frag.coverage;
    UpdateOuterEdges (e1);
}
```

The function UpdateOuterEdges (Fragment f) updates the outer edges of the fragment f after deleting the common shared edge(s).

Consider an example of a 2×2 region of a render target where individual pixels are marked as a, b, c and d in FIGS. 1-6. The illustrative triangles are indicated by triangle identifiers of the vertices and submitted in the order 012, 132, 143, 453, 352, and 562. Sample locations are shown in black circles in FIGS. 1-6 and pixel centers are shown as open circles. The merge buffer and a buffer that stores the shading quads, titled "shading quads," are also shown in FIGS. 1-6. Fragments are named corresponding to the pixel they cover and the suffix indicates the outer boundary of the polygon. The outer boundary of the polygon is maintained as a set of oriented edges with edge identifiers. When a new primitive covers a pixel, each of its edges are compared with the edges of the polygon's boundary to see if the polygon can be merged.

Figure 1:
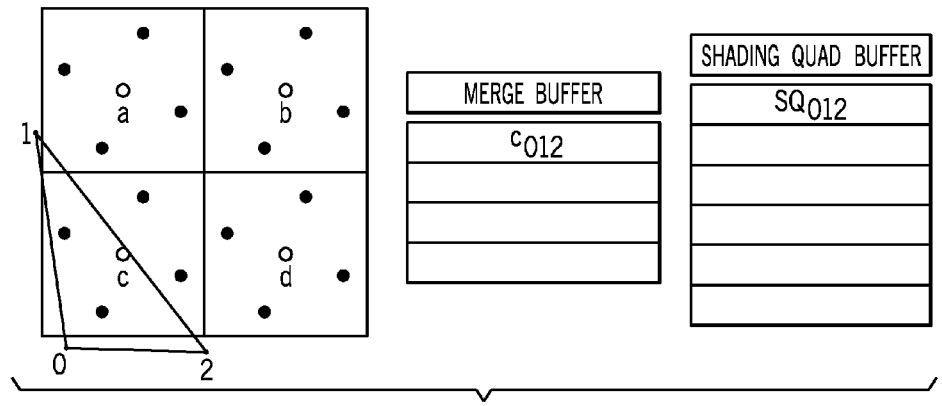
FIG. 1 is a depiction of a primitive on a shading quad.

FIG. 1 shows the primitive 012 covering a pixel c generating a fragment $c_{012}$ and the shading quad $SQ_{012}$. $SQ_{012}$ generates a shading quad by extrapolating the attributes using the plane equation of triangle 012.

Figure 2:
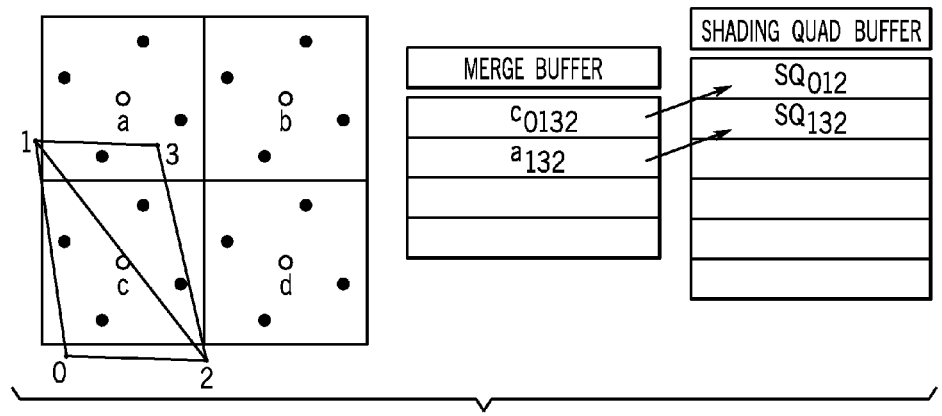
FIG. 2 is a depiction of a second primitive on the same shading quad.

When the next primitive 132 gets rasterized, two fragments $a_{132}$ and $c_{132}$ both point to the same shading quad $SQ_{132}$ are generated. However, because $c_{132}$ and $c_{012}$ share a common edge (1,2), are facing the same way and their coverage over pixel c is mutually exclusive, they are merged into a single fragment $c_{0132}$ as shown in FIG. 2. This single merged fragment points to the shading quad $SQ_{012}$ because the fragment $c_{012}$ (one of the merge candidates) covered the pixel center and pointed to $SQ_{012}$.

Figure 3:
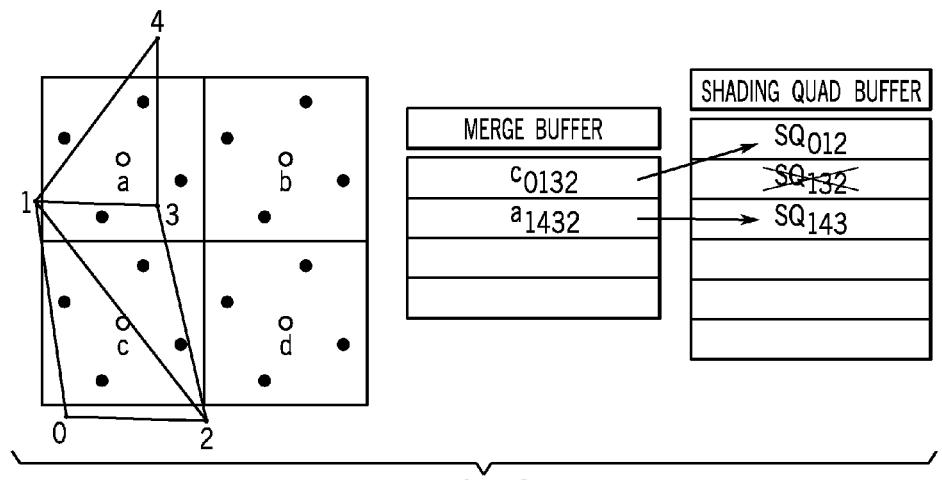
FIG. 3 is a depiction of a third primitive on the same shading quad.

FIG. 3 illustrates the events that happen when primitive 143 gets rasterized and merged. Because the merged fragment $a_{1432}$ starts pointing to a different shading quad ($SQ_{143}$) and there is no fragment that points to $SQ_{132}$, a reference counting mechanism deletes $SQ_{132}$ and marks that entry in the shading quad buffer as available.

Figure 4:
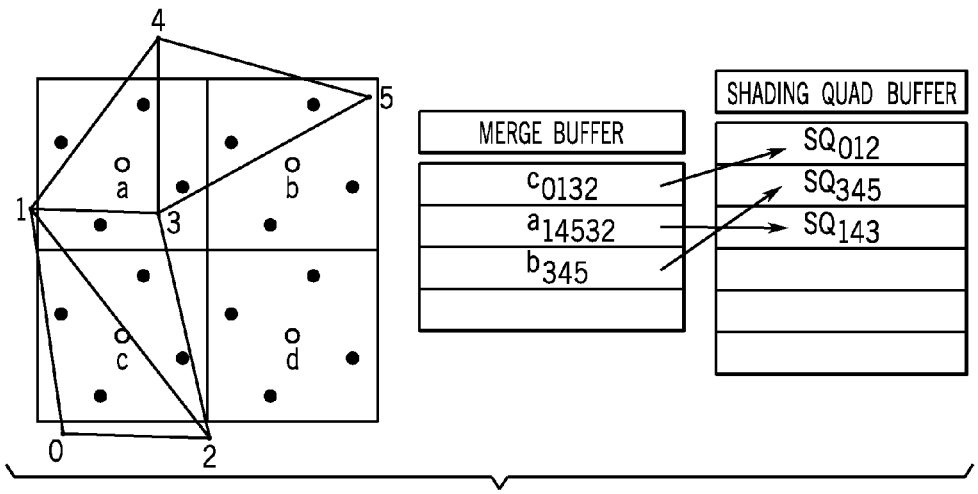
FIG. 4 is a depiction of a fourth primitive on the same shading quad.
Figure 5:
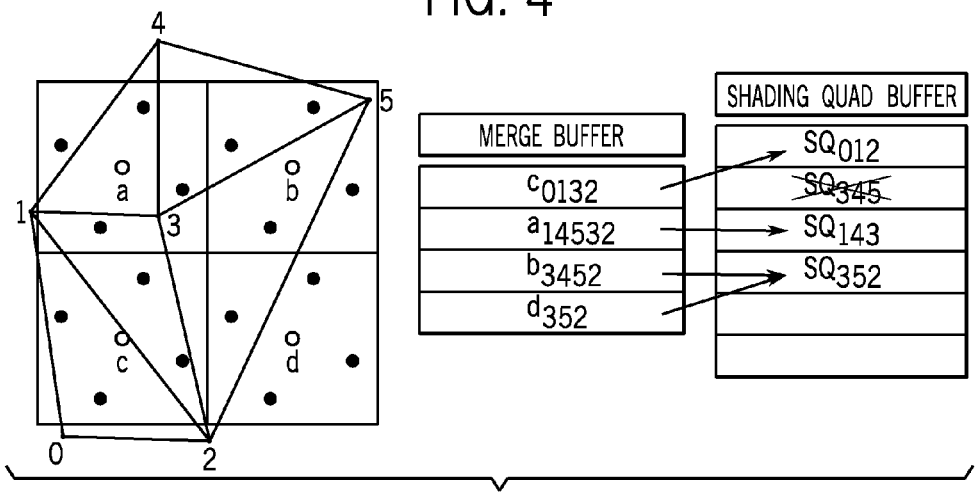
FIG. 5 is a depiction of a fifth primitive on the same shading quad.
Figure 6:
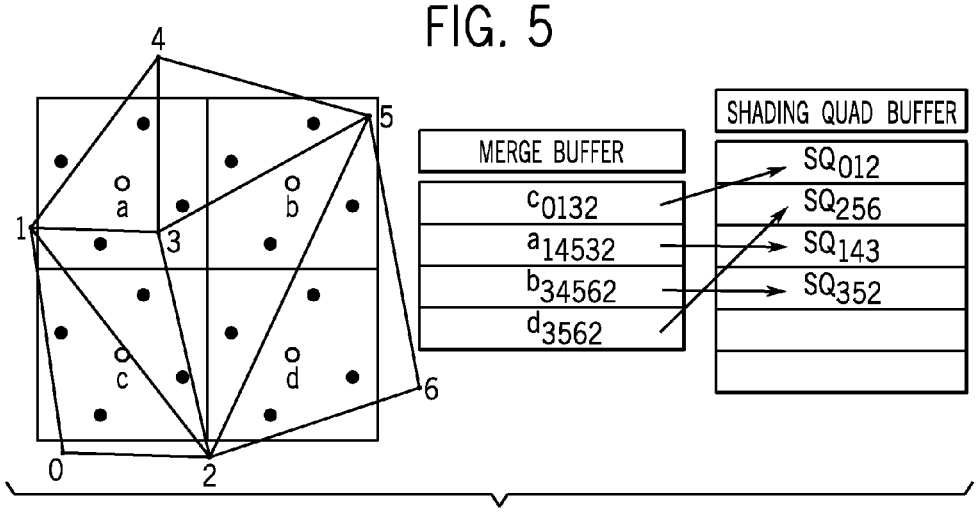
FIG. 6 is a depiction of a sixth primitive on the same shading quad.

FIGS. 4-6 show the merge process after successive primitives 345, 352, and 562 are rasterized and sent to the merge buffer.

As a result of merges, the number of shading requests have been reduced to 4 compared to 6. Shading quads are dispatched for shading when the fragments pointing to them have full coverage or the shading quad buffer is full or when an overlapping fragment arrives.

Figure 8:
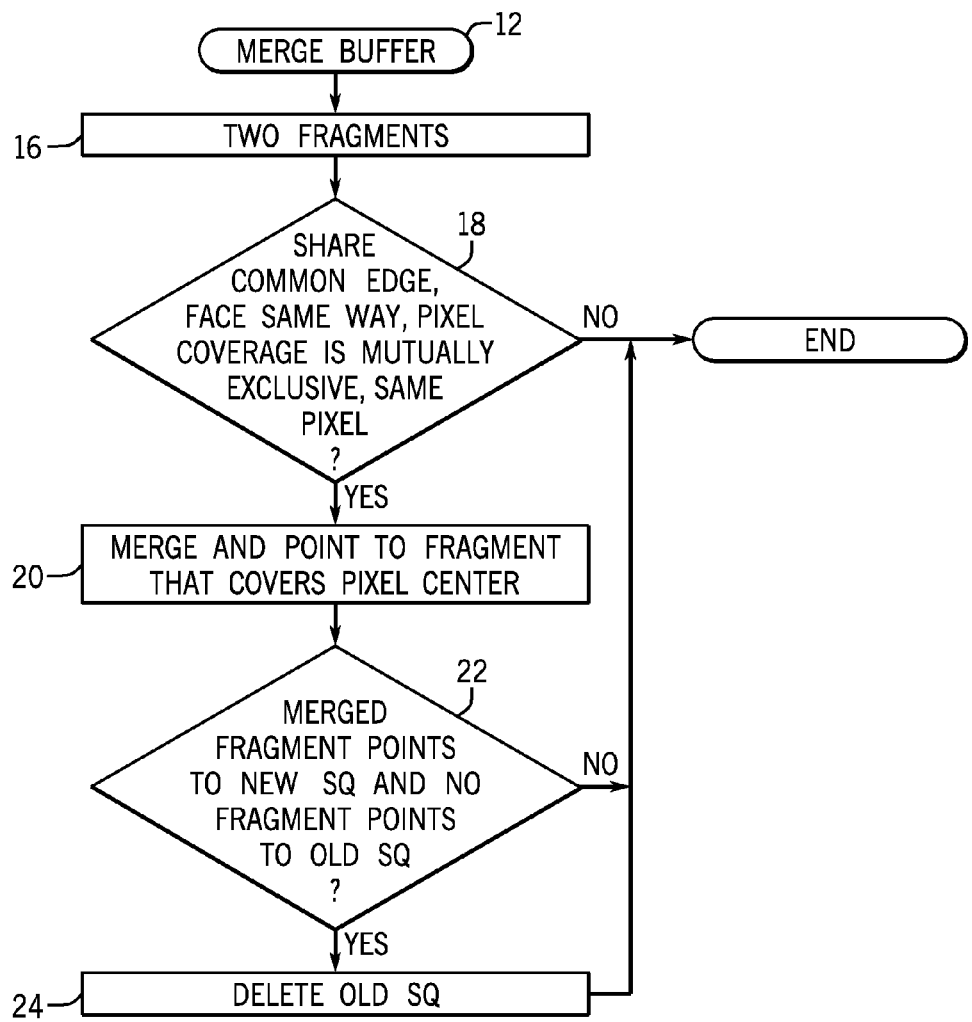
FIG. 8 is a flow chart for one embodiment.

Referring to FIG. 8, a merge buffer sequence 12 may be implemented in software, firmware and/or hardware. In software and firmware embodiments, it may be implemented by computer executed instructions stored in one or more non-transitory computer readable media, such as magnetic, optical, or semiconductor storages. For example, the sequence may be implemented by the merge buffer 12 of FIG. 7.

The merge buffer sequence 12 begins by receiving two fragments from neighboring primitives, as indicated in block 16. A check at diamond 18 determines whether the fragments share a common edge, face the same way, have mutually exclusive pixel coverage, and relate to the same pixel.

If so, the fragments are merged and point to that fragment that covers the pixel's center, as indicated in block 20. Then, a check at diamond 22 determines whether the merged fragment points to a new shading quad and no fragment points to the old shading quad. If so, the old shading quad is deleted, as indicated in block 24, and, in either case, the flow ends.

Coarse pixel shading may reduce power consumption by reducing the shading rate to less than one pixel, while keeping the visibility the same. The techniques described here are readily applicable to coarse pixel shading. This can be achieved by tracking one additional bit per entry in the merge buffer and the shading quad buffer that tracks the shading rate. No merge may happen across the shading rates in one embodiment. Coarse pixel shading has the effect of making triangles smaller in size. Scenes with smaller triangles are more likely to benefit from merging than ones with larger triangles.

In accordance with some embodiments, register pressure may be reduced compared to shading up to four different primitives in one batch since the shading system does not have to handle multiple primitives in one single batch. In addition, derivatives are not changed for all contributing fragments, only the shaded colors of neighboring samples (within that pixel) are used. In schemes that shade fragments for more than one primitive, the system may use incorrect derivatives for all the contributing fragments.

Even though some embodiments are described in the context of untessellated triangle meshes, a similar scheme may be employed for tessellated meshes. One can use the patch barycentric coordinates ((u, v)-s or (u, v, w)-s) at the tessellated vertices to track the edge identifiers for the edges that are internal to the patch. For edges along the edges, one can use the combination of parameter values and corner identifiers to establish the adjacency during the merge.

Another possible implementation may choose the triangle that has the largest coverage within a pixel, instead of choosing the one that covers the pixel center.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

Figure 9:
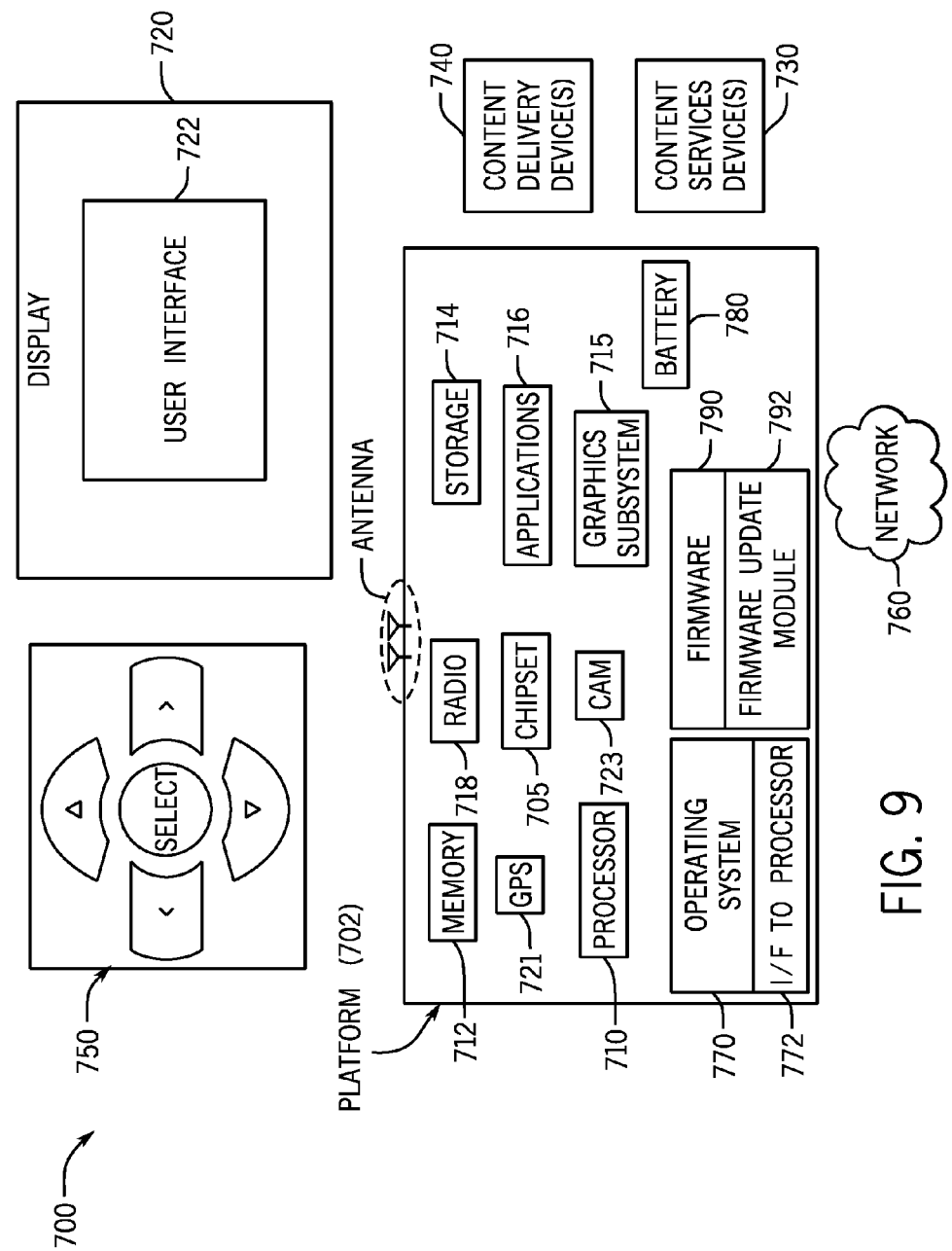
FIG. 9 is a system depiction for one embodiment.

FIG. 9 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 8, together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the disclosure.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions or sounds.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
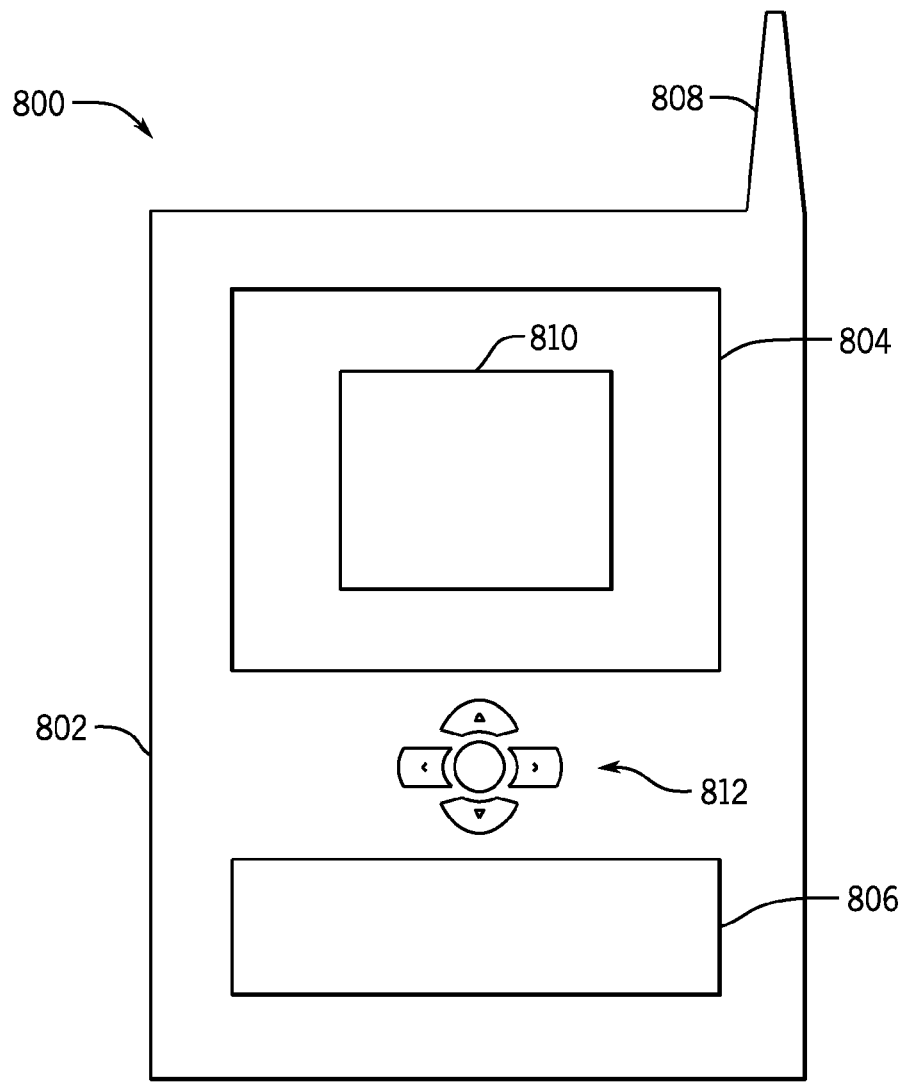
FIG. 10 is a front elevational view for one embodiment.

As described above, system 700 may be embodied in varying physical styles or form factors. FIG. 10 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequence shown in FIG. 8 in software and/or firmware embodiments.

As shown in FIG. 10, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a method comprising merging two fragments from neighboring primitives that cover the same pixel, and shading only one primitive at a time. The method may include delaying shading until information about a neighboring primitive is available. The method may include merging untessellated primitives. The method may include merging in tessellated meshes. The method may include merging if the two fragments face the same way and have mutually exclusive coverage. The method may include only shading the fragment that covers the pixel's center. The method may include only shading the fragment with largest coverage. The method may include using multi-sampled antialiasing. The method may include determining whether a merged fragment points to one shading quad and no fragment points to another shading quad. The method may include deleting the another shading quad.

Another example embodiment may include one or more non-transitory computer readable media storing instructions executed by a processor to perform a method comprising merging two fragments from neighboring primitives that cover the same pixel, and shading only one primitive at a time. The media may further store said method including delaying shading until information about a neighboring primitive is available. The media may further store said method including merging untessellated primitives. The media may further store said method including merging in tessellated meshes. The media may further store said method including merging if the two fragments face the same way and have mutually exclusive coverage. The media may further store said method including only shading the fragment that covers the pixel's center. The media may further store said method including only shading the fragment with largest coverage. The media may further store said method including using multi-sampled antialiasing. The media may further store said method including determining whether a merged fragment points to one shading quad and no fragment points to another shading quad. The media may further store said method including, if so, deleting the another shading quad.

In another example embodiment may be an apparatus comprising a processor to merge two fragments from neighboring primitives that cover the same pixel and to shade only one primitive at a time, and a storage coupled to said processor. The apparatus may include said processor to delay shading until information about a neighboring primitive is available. The apparatus may include said processor to merge untessellated primitives. The apparatus may include said processor to merge in tessellated meshes. The apparatus may include said processor to merge if the two fragments face the same way and have mutually exclusive coverage. The apparatus may include said processor to only shade the fragment that covers the pixel's center. The apparatus may include said processor to only shade the fragment with largest coverage. The apparatus may include an operating system, a battery and firmware and a module to update said firmware.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   merging two fragments from neighboring primitives that cover the same pixel; and
   determining which of the two fragments covers the pixel's center; and
   only shading the fragment that covers the pixel's center and refraining from shading a merged fragment that does not cover the pixel's center.

2. The method of claim 1 including delaying shading until information about a neighboring primitive is available.

3. The method of claim 1 including merging untessellated primitives.

4. The method of claim 1 including merging in tessellated meshes.

5. The method of claim 1 including merging if the two fragments face the same way and have mutually exclusive coverage.

6. The method of claim 1 including shading only one primitive at a time.

7. The method of claim 1 including only shading the fragment with largest coverage.

8. The method of claim 1 including using multi-sampled antialiasing.

9. The method of claim 1 including determining whether a merged fragment points to one shading quad and no fragment points to another shading quad.

10. The method of claim 9 including, if so, deleting the another shading quad.

11. One or more non-transitory computer readable media storing instructions executed by a processor to perform a method comprising:
    merging two fragments from neighboring primitives that cover the same pixel;
    determining which of the two fragments covers the pixel's center; and
    only shading the fragment that covers the pixel's center and refraining from shading a merged fragment that does not cover the pixel's center.

12. The media of claim 11, said method including delaying shading until information about a neighboring primitive is available.

13. The media of claim 11, said method including merging untessellated primitives.

14. The media of claim 11, said method including merging in tessellated meshes.

15. The media of claim 11, said method including merging if the two fragments face the same way and have mutually exclusive coverage.

16. The media of claim 11, said method including shading only one primitive at a time.

17. The media of claim 11, said method including only shading the fragment with largest coverage.

18. The media of claim 11, said method including using multi-sampled antialiasing.

19. The media of claim 11, said method including determining whether a merged fragment points to one shading quad and no fragment points to another shading quad.

20. The media of claim 19, said method including, if so, deleting the another shading quad.

21. An apparatus comprising:
    a processor to merge two fragments from neighboring primitives that cover the same pixel, determine which of the two fragments covers the pixel's center, and only shade the fragment that covers the pixel's center and refrain from shading a merged fragment that does not cover the pixel's center; and
    a storage coupled to said processor.

22. The apparatus of claim 21, said processor to delay shading until information about a neighboring primitive is available.

23. The apparatus of claim 21, said processor to merge untessellated primitives.

24. The apparatus of claim 21, said processor to merge in tessellated meshes.

25. The apparatus of claim 21, said processor to merge if the two fragments face the same way and have mutually exclusive coverage.

26. The apparatus of claim 21, said processor to shade only one primitive at a time.

27. The apparatus of claim 21, said processor to only shade the fragment with largest coverage.

28. The apparatus of claim 21 including a display communicatively coupled to the processor.

29. The apparatus of claim 21 including a battery coupled to said processor.

30. The apparatus of claim 21 including firmware and a module to update said firmware.

* * * * *